United States Patent
Pawley et al.

(10) Patent No.: US 7,258,214 B2
(45) Date of Patent: Aug. 21, 2007

(54) OVERRUNNING COUPLING ASSEMBLY AND METHOD FOR CONTROLLING THE ENGAGEMENT OF PLANAR MEMBERS

(75) Inventors: Brice A. Pawley, Midland, MI (US); Brian W. Smithwick, Clio, MI (US)

(73) Assignee: Means Industries, Inc., Saginaw, MI (US)

( * ) Notice: Subject to any disclaimer, the term of this patent is extended or adjusted under 35 U.S.C. 154(b) by 203 days.

(21) Appl. No.: 11/148,910

(22) Filed: Jun. 9, 2005

(65) Prior Publication Data

US 2006/0278486 A1 Dec. 14, 2006

(51) Int. Cl.
*F16D 41/16* (2006.01)

(52) U.S. Cl. .................. 192/43.1; 192/46; 192/47; 192/69.1

(58) Field of Classification Search ............... 192/69.1, 192/43.2
See application file for complete search history.

(56) References Cited

U.S. PATENT DOCUMENTS

| | | |
|---|---|---|
| 5,070,978 A | 12/1991 | Pires |
| 5,449,057 A | 9/1995 | Frank |
| 5,597,057 A | 1/1997 | Ruth et al. |
| 5,806,643 A | 9/1998 | Fitz |
| 5,871,071 A | 2/1999 | Sink |
| 5,918,715 A | 7/1999 | Ruth et al. |
| 5,927,455 A | 7/1999 | Baker et al. |
| 5,964,331 A | 10/1999 | Reed et al. |
| 5,967,277 A * | 10/1999 | Walter ................ 192/43.1 |
| 5,979,627 A | 11/1999 | Ruth et al. |
| 5,992,592 A * | 11/1999 | Showalter ............ 192/43.1 |
| 6,065,576 A | 5/2000 | Shaw et al. |
| 6,116,394 A | 9/2000 | Ruth |
| 6,125,980 A | 10/2000 | Ruth et al. |
| 6,129,190 A | 10/2000 | Reed et al. |
| 6,186,299 B1 | 2/2001 | Ruth |
| 6,193,038 B1 | 2/2001 | Scott et al. |
| 6,244,965 B1 | 6/2001 | Klecker et al. |
| 6,386,349 B1 | 5/2002 | Welch |
| 6,481,551 B1 | 11/2002 | Ruth |
| 6,505,721 B1 | 1/2003 | Welch |
| 6,571,926 B2 | 6/2003 | Pawley |
| 6,854,577 B2 | 2/2005 | Ruth |

* cited by examiner

*Primary Examiner*—Rodney H. Bonck
(74) *Attorney, Agent, or Firm*—Brooks Kushman P.C.

(57) ABSTRACT

An overrunning coupling assembly and a method of controlling the engagement of planar first and second members are provided wherein two sets of opposed engaging struts are applied with one motion of a single control plate or member. The planar first and second members have inside surfaces extending generally normal to a first axis. The assembly includes free-floating, forward keys and free-floating, reverse keys opposed to the forward keys. The forward and reverse keys are movable between a notch-engaging, engaged position and a disengaged position in which the second member is permitted to free-wheel relative to the first member. The planar control member is disposed between the first and second surfaces and is controllably rotatable about the first axis between first and second angular positions relative to the first member.

11 Claims, 4 Drawing Sheets

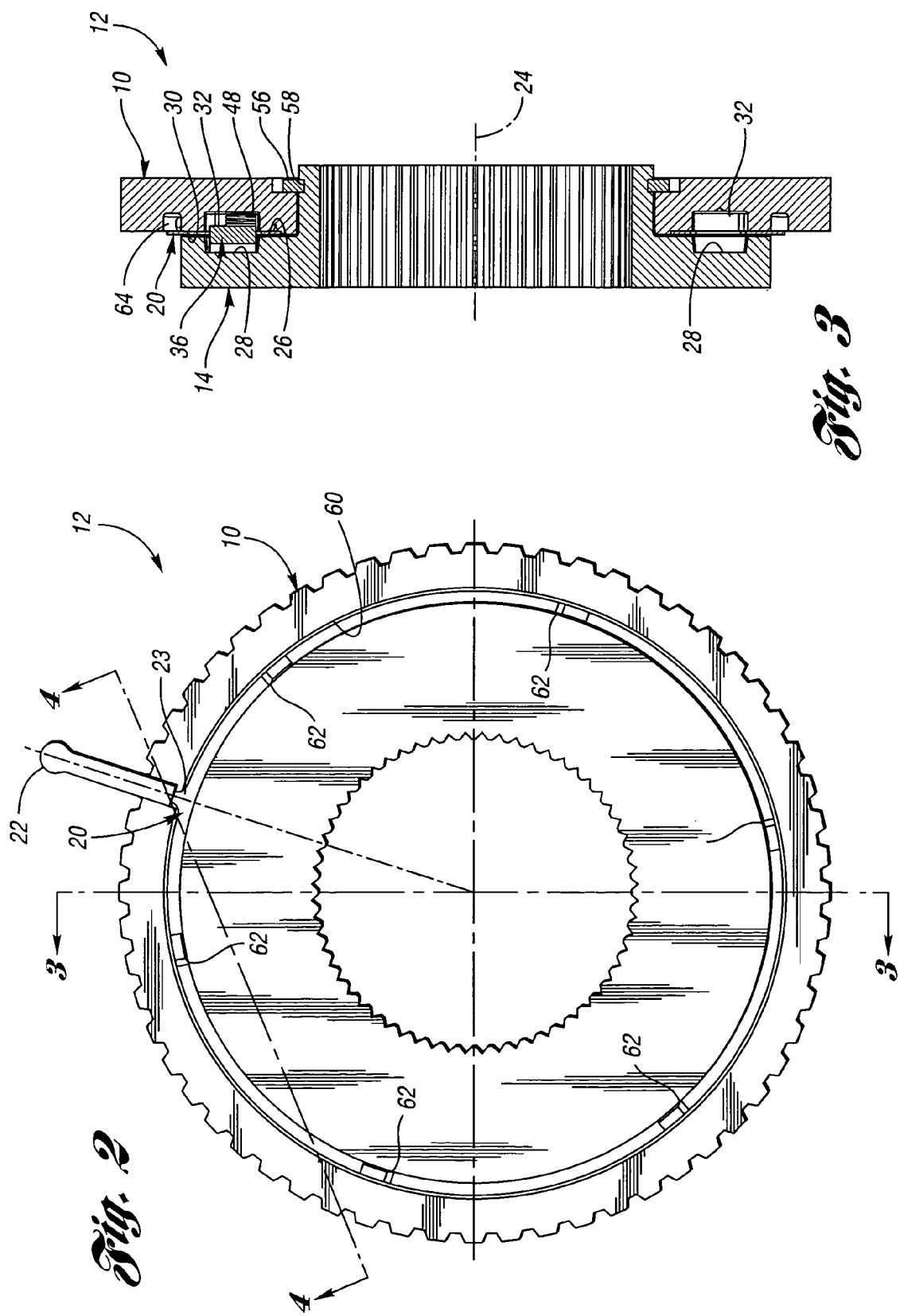

OVERRUNNING COUPLING ASSEMBLY AND METHOD FOR CONTROLLING THE ENGAGEMENT OF PLANAR MEMBERS

BACKGROUND OF THE INVENTION

1. Field of the Invention

This invention relates to overrunning coupling assemblies and methods for controlling the engagement of planar members.

2. Background Art

Overrunning coupling assemblies may be used for transferring torque from a driving member to a driven member in a variety of structural environments. This permits the transfer of torque from a driving member to a driven member while permitting freewheeling motion of the driving member relative to the driven member when torque is interrupted. Such couplings often comprise an outer race concentrically disposed with respect to an inner race, the outer race having cammed surfaces that define a pocket in which coupling rollers are assembled.

A driving member is connected to one race, and a driven member is connected to the other race. During torque transfer from the driving member to the driven member, the rollers become locked with a camming action against the cam surfaces, thereby establishing a positive driving connection between the driving member and the driven member. When the torque is interrupted, the driven member may freewheel relative to the driving member as the rollers become unlocked from their respective cam surfaces.

Another common overrunning coupling includes inner and outer races wherein one race is connected to a driving member and the other race is connected to the driven member. Overrunning coupling sprags are disposed between the inner cylindrical surface of the outer race and the outer cylindrical surface of the inner race so that the sprags lock the races together as torque is delivered to the driven member. The sprags become unlocked with respect to the inner and outer race surfaces when torque transfer is interrupted.

U.S. Pat. No. 5,927,455 discloses a bi-directional overrunning pawl-type clutch having a driving member mounted for power rotation, a driven member mounted for rotation adjacent the driving member, with each of the driving and driven members having pawl engaging shoulders, and a plurality of rigid pawls interposed between the driving and driven members. A control element is mounted for shifting movement between the driving and driven members to control the position of the pawls which are yieldably biased toward positions of engagement extending between the driving and driven members to produce driving engagement therebetween. The control element is shiftable to various positions to permit driving and overrunning in one direction or driving and overrunning in the opposite direction dependent upon the direction of rotation of the driving member.

U.S. Pat. No. 6,244,965 discloses a planar overrunning coupling for transfer of torque from a driving member to a driven member in one direction and which permits freewheeling motion between the members upon a torque reversal. The coupling includes coupling plates situated in close proximity with a strut retainer plate disposed between them. One plate is connected to the driving member and the other plate is connected to the driven member. Each plate has strut recesses. A series of struts is located in the recesses of one plate so that each strut may be pivoted, thereby allowing the struts to engage the companion recesses in the other coupling plate. The retainer has angularly spaced apertures that register with the struts to permit pivotal movement of the struts when the retainer plate is in one rotary position. The retainer plate, when it is in a second rotary position, prevents pivotal motion of the struts, thereby permitting freewheeling relative motion of the coupling plates.

U.S. Pat. No. 6,116,394 discloses an overrunning coupling assembly including a notch plate and an annular coupling pocket plate positioned in face-to-face relationship with respect to each other along a common axis. The pocket plate includes strut pockets disposed at angularly spaced positions about the axis. The notch plate includes notch recesses at angularly spaced positions about the common axis and positioned in juxtaposed relationship with respect to the strut pockets. The notch plate includes an inner circumferential rail at a radially inward side of the notch recesses and an outer circumferential rail at a radially outward side of the notch recesses. Torque-transmitting struts are positioned in the strut pockets. Each strut has first and second ears at one edge thereof for enabling pivotal motion of the struts about an ear axis intersecting the ears. The opposite edge of each strut is engageable with one of the notch recesses whereby one-way torque transfer may occur between the plates. Each opposite edge has first and second corners. Each strut pocket is sufficiently enlarged to allow pivotal movement of each strut about a strut axis which is parallel with the common axis, thereby enabling one of the first and second corners to be selectively supported by one of the inner and outer circumferential rails to prevent the struts from slapping against the notch recesses as the notch plate and pocket plate are respectively counterrotated.

U.S. Pat. No. 5,964,331 discloses a one-way clutch comprising a pocket plate and a notch plate situated in a juxtaposed adjacent relationship. One-way clutches of this kind are sometimes referred to as planar clutches because the adjacent juxtaposed surfaces are situated in radial planes with respect to the axis of the clutch.

For purposes of this disclosure, the term coupling should be interpreted to include clutches or brakes wherein one of the plates is drivably connected to a torque delivery element of a transmission and the other plate is drivably connected to another torque delivery element or is anchored and held stationary with respect to a transmission housing. The terms coupling, clutch and brake may be used interchangeably.

A pocket plate may be provided with angularly disposed recesses or pockets about the axis of a one-way clutch. The pockets are formed in the planar surface of the pocket plate. Each pocket receives a torque transmitting strut, one end of which engages an anchor point in a pocket of the pocket plate. An opposite edge of the strut, which may hereafter be referred to as an active edge, is movable from a position within the pocket to a position in which the active edge extends outwardly from the planar surface of the pocket plate. The struts may be biased away from the pocket plate by individual springs.

A notch plate may be formed with a plurality of recesses or notches located approximately on the radius of the pockets of the pocket plate. The notches are formed in the planar surface of the notch plate.

Another example of an overrunning planar clutch is disclosed in U.S. Pat. No. 5,597,057.

Other U.S. patents related to the present invention include: U.S. Pat. Nos. 5,070,978; 5,449,057; 5,806,643; 5,871,071; 5,918,715; 5,979,627; 6,065,576; 6,125,980; 6,129,190; 6,186,299; 6,193,038; 6,386,349; 6,481,551; 6,505,721; 6,571,926; and 6,854,577.

It is often desirable to have opposed engaging struts in a selectable or controllable clutch or coupling assembly so that torque can be transferred in both directions about an axis. It is also desirable to have an overrunning or freewheeling capability in such clutches or assemblies. One way to control such sets of opposed struts or keys is to provide two slide or control plates. However, two slide plates add cost and complexity to the selectable clutch. In addition, such plates are more difficult to control external to the clutch.

SUMMARY OF THE INVENTION

An object of the present invention is to provide an overrunning coupling assembly and method for controlling the engagement of planar members wherein a single control plate or member is provided to reduce the above-noted cost, complexity and control concerns.

In carrying out the above object and other objects of the present invention, an overrunning coupling assembly is provided. The assembly includes a planar first member having an inside first surface. The first member has at least one recess formed in the first surface. The assembly further includes a planar second member rotatable about a first axis having an inside second surface extending generally normal to the first axis and disposed closely adjacent to the first surface. The second surface has at least one notch formed there. The assembly includes at least one free-floating, forward key and at least one free-floating, reverse key opposed to the at least one forward key. The keys are received and retained in the at least one recess but not physically secured to the first member. The forward and reverse keys are movable between a notch-engaging, engaged position and a disengaged position in which the first and second members are permitted to free-wheel relative to each other. A first set of biasing members are carried by the first member and urge the forward and reverse keys toward the second surface. A single planar control member is disposed between the first and second surfaces and is controllably rotatable about the first axis between first and second angular positions relative to the first member. The control member has at least one aperture which extends completely therethrough to allow the forward and reverse keys to extend therethrough to the notch-engaging, engaged position in the first angular position of the control member. The control member maintains the forward and reverse keys in the disengaged position in the second angular position of the control member.

The at least one recess may be sufficiently enlarged to allow pivotal movement of one of the keys about a key axis which is substantially parallel to the first axis. The assembly may further include at least one biasing member carried by the first member to urge the one of the keys to pivot about the key axis during rotation of the control member.

One forward key and one reverse key may be received and retained in the same recess.

One forward key and one reverse key may extend through the same aperture in the control member in the notch-engaging, engaged position.

A plurality of adjacent notches may be formed in the second surface, and one forward key and one reverse key may engage adjacent notches in the second surface in the engaged position.

At least one of the keys is trapezoidal in cross section to facilitate movement of the at least one key out of its engaged position.

Further in carrying out the above object and other objects of the present invention, an overrunning coupling assembly is provided. The assembly includes a planar first member having an inside first surface. The first member has at least one recess formed in the first surface. A planar second member is rotatable about a first axis and has an inside second surface extending generally normal to the first axis and disposed closely adjacent to the first surface. The second surface has at least one notch formed therein. The assembly includes at least one free-floating, forward key and at least one free-floating, reverse key opposed to the at least one forward key. The keys are received and retained in the at least one recess but not physically secured to the first member. The forward and reverse keys are movable between a notch-engaging, engaged position and a disengaged position in which the first and second members are permitted to free-wheel relative to each other. A first set of biasing members are carried by the first member and urge the forward and reverse keys toward the second surface. A single planar control member is disposed between the first and second surfaces and is controllably rotatable about the first axis between first and second angular positions relative to the first member. The control member has at least one aperture which extends completely therethrough to allow the forward and reverse keys to extend therethrough to the notch-engaging, engaged position in the first angular position of the control member. The control member maintains the forward and reverse keys in the disengaged position in the second angular position of the control member. At least one biasing member is carried by the first member and urges one of the keys to pivot about a key axis which is substantially parallel to the first axis during rotation of the control member.

One forward key and one reverse key may be received and retained in the same recess.

One forward key and one reverse key may extend through the same aperture in the control member in the notch-engaging, engaged position.

A plurality of adjacent notches may be formed in the second surface, and one forward key and one reverse key may engage adjacent notches in the second surface in the engaged position.

At least one of the keys is trapezoidal in cross section to facilitate movement of the at least one key out of its engaged position.

Still further in carrying out the above object and other objects of the present invention, a method of controlling engagement of planar first and second members is provided. The first member has an inside first surface. The first member has at least one recess formed in the first surface. The planar second member is rotatable about a first axis and has an inside second surface extending generally normal to the first axis and disposed closely adjacent to the first surface. The second surface has at least one notch formed therein. The method includes providing at least one free-floating, forward key and at least one free-floating, reverse key opposed to the at least one forward key. The keys are received and retained in the at least one recess but not physically secured to the first member. The method further includes urging the forward and reverse keys toward the second surface. The method includes providing a single planar control member between the first and second surfaces and which is rotatable about the first axis relative to the first member. The control member has at least one aperture which extends completely therethrough. The method further includes rotating the control member relative to the first member about the first axis. The at least one aperture allows the keys to extend therethrough and engage the at least one notch in the second member in a first angular position of the control member. The control member maintains the keys in a disengaged position in a second angular position of the control member in which the first and second members are positioned to free-wheel relative to each other.

The method may further include rotating one of the keys to pivot about a key axis which is substantially parallel to the first axis to permit free-wheeling of the first and second members.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2 is a top plan view of the assembly of FIG. 1;

FIG. 3 is a sectional view taken along lines 3-3 of FIG. 2;

DETAILED DESCRIPTION OF THE PREFERRED EMBODIMENTS

Figure 1:
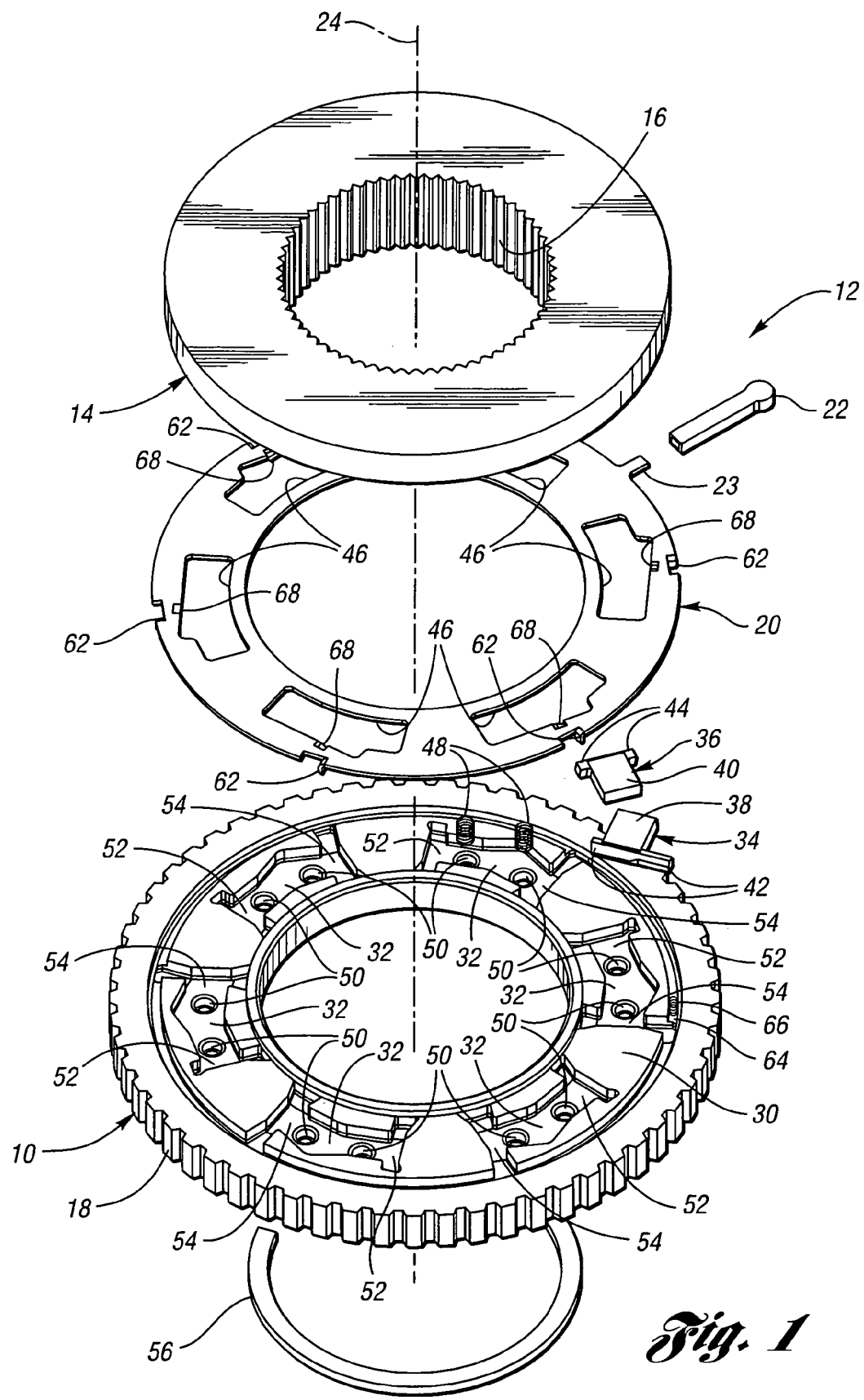
FIG. 1 is an exploded, perspective view of an overrunning coupling or clutch assembly constructed in accordance with one embodiment of the present invention.

FIG. 1 shows a pocket plate, generally indicated at 10, of a planar or overrunning coupling or clutch assembly, generally indicated at 12, constructed in accordance with one embodiment of the present invention. A driving coupling or notch plate, generally indicated at 14, is nested within the pocket plate 10. The driving notch plate 14 is to be drivably connected to a torque input shaft (not shown). This driving connection is established by internal splines 16 formed on the driving notch plate 14, which drivably engage external splines on the input shaft.

The pocket plate 10 is provided with external splines 18.

An actuator (not shown) may be drivably connected to a slide or control plate, generally indicated at 20, via a slide plate fork 22, which is secured to a tab 23 of the control member or plate 20, thereby causing the control plate 20 to be adjusted angularly with respect to the axis of the input shaft (which corresponds to a first axis 24 about which the plates 14 and 20 are rotatable, as shown in FIG. 3). The control plate 20 is disposed between the plates 10 and 14 for limited angular rotation relative to the plates 10 and 14.

Figure 6:
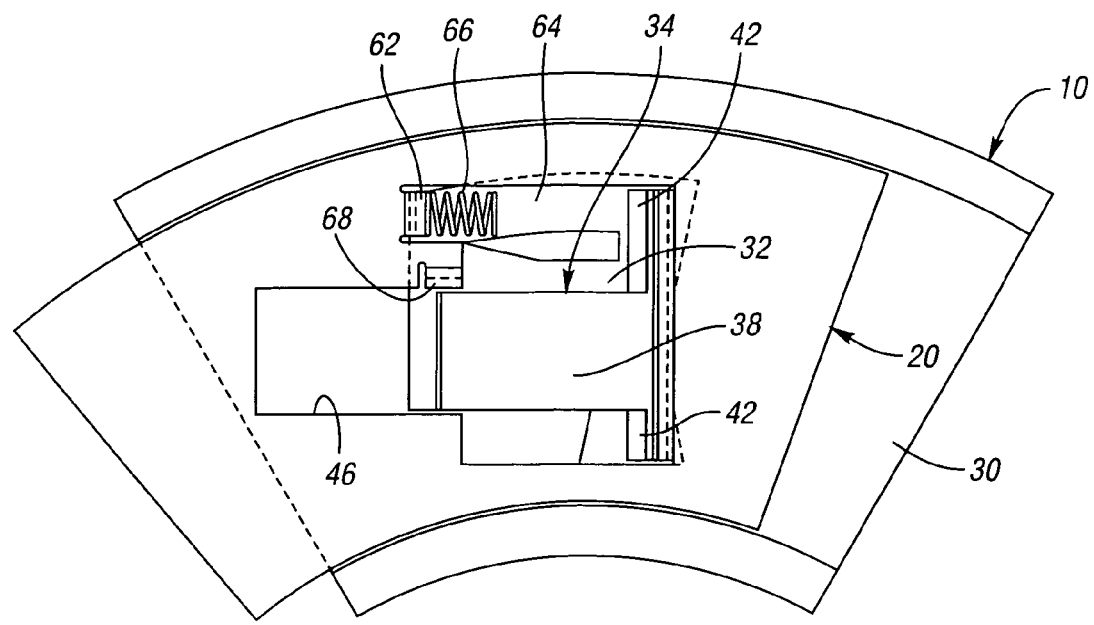
FIG. 6 is a schematic, top plan view, partially broken away, illustrating a forward strut, a control plate and a pocket plate of another embodiment of the assembly (without the corresponding reverse strut for purposes of simplicity) wherein the assembly is in a locked position.
Figure 7:
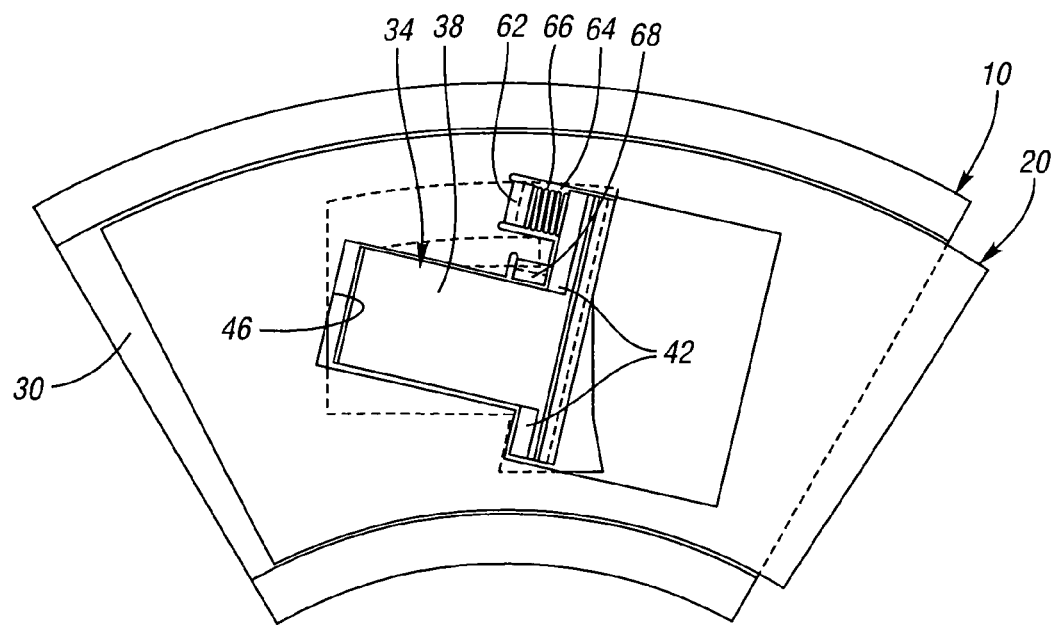
FIG. 7 is a view similar to the view of FIG. 6 wherein the assembly is in an overrun position.

The plate 14 can free-wheel in both angular directions about the axis 24 relative to the plate 10. The bi-directional free-wheeling motion is achieved in an operating mode when the actuator adjusts the angular position of the control plate 20 relative to the pocket plate 10 (via the fork 22) about the axis 24 to a position (i.e., overrun or disengaged position), as shown in FIG. 7. FIG. 6 illustrates an angular position (i.e., locked or engaged position) of the control plate 20 relative to the pocket plate 10.

Figure 5:
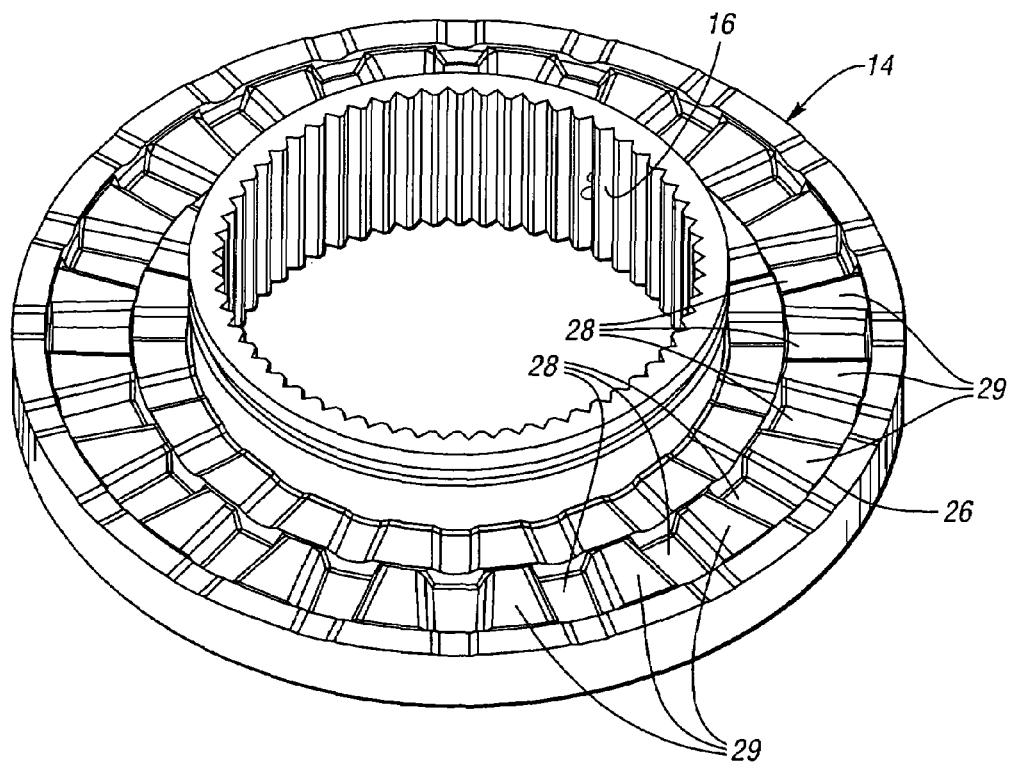
FIG. 5 is a perspective view of a notch plate of the assembly of FIG. 1.

FIG. 1 illustrates the clutch or coupling assembly 12 in an exploded view. The driving notch plate 14 has an inside surface 26 with one or more notches 28 formed therein and separated by common walls 29, as shown in FIG. 5. The notch plate 14 is adapted to be received in the pocket plate 10.

The pocket plate 10 has an inside surface 30 with one or more elongated recesses 32 formed therein. Located intermediate the inside surfaces 26 and 30 of the plate 14 and the plate 10, respectively, is the control plate 20.

There are preferably twelve struts or keys received and retained in the six recesses 32 in pocket plate 10. Six of the keys are forward keys 34 for transferring torque in a forward direction about the axis 24 and six of the keys are reverse keys 36 opposed to their respective forward keys 34 for transferring torque in a reverse direction about the axis 24. Each of the struts or keys 34 and 36 includes a planar substantially rectangular portion 38 and 40, respectively, and a pair of ears 42 and 44, respectively. Each recess 32 preferably receives and retains one forward key 34 and one reverse key 36, which opposes its respective forward key 34 as best shown in FIG. 4.

Figure 4:
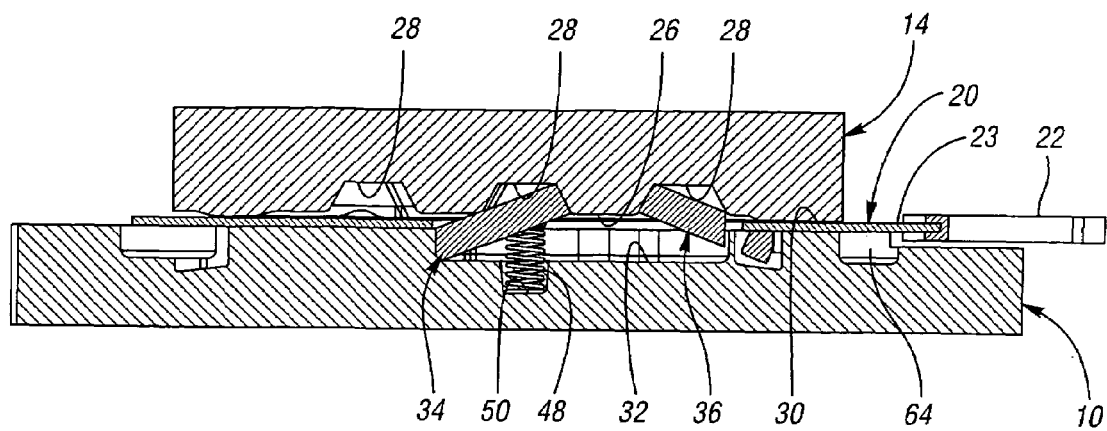
FIG. 4 is a sectional view taken along lines 4-4 of FIG. 3.

As best shown in FIG. 4, the struts 34 and 36 are trapezoidal in cross section. In other words, the face free edges of the struts 34 and 36 are angled (i.e. are not parallel) to improve the ability of the plates 10 and 14 to disengage.

A reverse key such as the reverse key 36 is not shown in FIGS. 6 and 7 for purposes of simplicity. However, it is to be understood that a reverse key 36 is preferably disposed in each recess 32 which also receives and retains a forward key 34.

As seen in FIG. 4, pivotal edges (i.e., the edges of the keys about which they rotate within the recesses 32) of the struts 34 and 36 are located at opposite ends of the recess 32. Similarly, the pivotal edges for the other struts 34 and 36 are located at opposite ends of their respective recesses 32.

The control plate 20 is provided with six elongated apertures 46. These are equally spaced and arranged angularly about the axis 24. When the control plate 20 is appropriately positioned angularly for torque transfer in either direction about the axis 24, one aperture 46 will be disposed directly over each recess 32 (i.e., see FIGS. 3 and 4; FIG. 6 shows only a portion of the recess 32, a portion of the aperture 46 and the forward key 34 but not its corresponding reverse key 36 for purposes of simplicity).

The apertures 46 and the notches 28 are sized so that the portions 38 and 40 of the keys 34 and 36, respectively, can enter adjacent notches 28 in the notch plate 14 and engage edges of the notches 28 to establish a locking action between the keys 34 and 36 and the plate 14 that will permit torque transfer in both directions between the plate 14 and the plate 10.

If the control plate 20 is rotated to different angular positions, as shown in FIG. 7, both struts 34 and 36 in each recess 32 rotate downwardly into their recess 32 and will be at least partially covered by the control plate 20 and prevented from moving pivotally upward about their respective pivotal edges. (As described hereinbelow, the forward key 34 also rotates about a key axis which is substantially parallel to the axis 24 during such control plate 20 rotation.) When the control plate 20 is thus positioned, the plate 14 can free-wheel, in either direction about the axis 24 with respect to the plate 10.

The forward keys 34 may be covered by the control plate 20 and/or the notch plate 14. The keys 34 may rotate outwardly while being partially held by the notch plate 14. In other words, the control plate 20 may move before the torque is released on the forward keys 34. As the control plate 20 is rotated to an angular position as shown in FIG. 7, the forward keys 34 do not all necessarily rotate outward immediately. If the forward struts 34 are loaded at time of control plate movement, the struts 34 will remain locked. Once the assembly begins forward over run movement, the struts 34 will be forced down by the notch plate 14 and rotated into final over run position by the springs 66.

Although any suitable strut spring can be used with the invention, FIGS. 1, 3 and 4 show strut coil springs 48 used in this embodiment of the invention. One spring 48 is located under each of the struts 34 and 36 within recesses 50 formed in the recesses 32.

FIG. 1 also shows elongated portions 52 and 54 of the recesses 32 that receive the ear portions 44 and 42, respectively, of the struts 36 and 34, respectively. The portions 52 and 54 of the recesses 32 are sized so that the ear portions 44 and 42, respectively, at the pivotal edge of each of the struts 36 and 34, respectively, can be secured therein.

When the notch plate 14 is received within the pocket plate 10 with the control plate 20 therebetween, the plates 10 and 14 are held axially fast by retainer ring or snap-ring 56. The snap-ring 56 is received and retained in an external groove 58 formed in the notch plate 14, the groove 58 being seen in FIG. 3. When assembled, the control plate 20 is located within an annular groove 60 formed in the pocket plate 10. As seen in FIG. 1, the control plate 20 is provided with angularly spaced, outer peripheral bent flanges 62 which extend into an outer peripheral groove 64 formed in the inside surface or face 30 of the plate 10. The control plate 20 thus can slide angularly about the axis 24 of the assembly 12.

Coil springs, one of which is shown at 66 in FIGS. 6 and 7, are disposed in the groove 64 between the flanges 62 and the larger one of the ears 42 of the forward keys 34. Upon movement of the control plate 20 in a clockwise direction from the locked position of FIG. 6, the flanges 62 urge their respective springs into contact with the larger one of the ears 42 of the key 34 and thereby compress the coil springs 66 to rotate the key 34 about an axis substantially parallel to the axis 24. The keys 34 are rotated within the recesses 32 until they reach the overrun position of FIG. 7. Inner flanges 68 which extend from the apertures 46 in the control plate 20 help to control rotation of the keys 34 within their respective recesses 32 during rotation from overrun to the lock-up position.

In general and with reference to FIGS. 6 and 7, for overrun, the slide plate 20 rotates clockwise, lays down the reverse struts 36 (not shown in FIGS. 6 and 7) and the springs 66 contact the ears 42 of the forward struts 34. The forward struts 34 rotates outwardly and the clutch assembly 12 overruns.

For lockup, the slide plate 20 rotates counterclockwise, the springs 66 releases tension and the forward struts rotate 34 into lock-up position urged by the inner flanges 68. The reverse struts 36 flip up and the assembly 12 is locked.

The configuration of the notch and pocket plates 14 and 10, respectively, of the assembly 12 reduce parasitic overrun drag. This happens due to the inability of the assembly 12 to hold any significant amount of oil over and above boundary lubrication.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An overrunning coupling assembly comprising:
 a planar first member having an inside first surface and at least one recess formed in the first surface;
 a planar second member rotatable about a first axis and having an inside second surface extending generally normal to the first axis and disposed closely adjacent to the first surface, the second surface having at least one notch formed therein;
 at least one free-floating, forward key and at least one free-floating, reverse key opposed to the at least one forward key, the keys being received and retained in the at least one recess but not physically secured to the first member, the forward and reverse keys being movable between a notch-engaging, engaged position and a disengaged position in which the first and second members are permitted to free-wheel relative to each other;
 a first set of biasing members carried by the first member and urging the forward and reverse keys toward the second surface; and
 a single planar control member disposed between the first and second surfaces and being controllably rotatable about the first axis between first and second angular positions relative to the first member, the control member having at least one aperture which extends completely therethrough to allow the forward and reverse keys to extend therethrough to the notch-engaging, engaged position in the first angular position of the control member and wherein the control member maintains the forward and reverse keys in the disengaged position in the second angular position of the control member wherein the at least one recess is sufficiently enlarged to allow pivotal movement of one of the keys about a key axis which is substantially parallel to the first axis and wherein the assembly further comprises a second biasing member carried by the first member and urging the one of the keys to pivot about the key axis during rotation of the control member.

2. The assembly as claimed in claim 1, wherein one forward key and one reverse key are received and retained in the same recess.

3. The assembly as claimed in claim 1, wherein one forward key and one reverse key extend through the same aperture in the control member in the notch-engaging, engaged position.

4. The assembly as claimed in claim 1, wherein a plurality of adjacent notches are formed in the second surface and wherein one forward key and one reverse key engage adjacent notches in the second surface in the engaged position.

5. The assembly as claimed in claim 1, wherein at least one of the keys is trapezoidal in cross section to facilitate movement of the at least one key out of its engaged position.

6. An overrunning coupling assembly comprising:
 a planar first member having an inside first surface and at least one recess formed in the first surface;
 a planar second member rotatable about a first axis and having an inside second surface extending generally normal to the first axis and disposed closely adjacent to the first surface, the second surface having at least one notch formed therein;
 at least one free-floating, forward key and at least one free-floating, reverse key opposed to the at least one forward key, the keys being received and retained in the at least one recess but not physically secured to the first member, the forward and reverse keys being movable between a notch-engaging, engaged position and a disengaged position in which the first and second members are permitted to free-wheel relative to each other;

a first set of biasing members carried by the first member and urging the forward and reverse keys toward the second surface;

a single planar control member disposed between the first and second surfaces and being controllably rotatable about the first axis between first and second angular positions relative to the first member, the control member having at least one aperture which extends completely therethrough to allow the forward and reverse keys to extend therethrough to the notch-engaging, engaged position in the first angular position of the control member and wherein the control member maintains the forward and reverse keys in the disengaged position in the second angular position of the control member; and a second biasing member carried by the first member and urging one of the keys to pivot about a key axis which is substantially parallel to the first axis during rotation of the control member.

7. The assembly as claimed in claim 6, wherein one forward key and one reverse key are received and retained in the same recess.

8. The assembly as claimed in claim 6, wherein one forward key and one reverse key extend through the same aperture in the control member in the notch-engaging, engaged position.

9. The assembly as claimed in claim 6, wherein a plurality of adjacent notches are formed in the second surface and wherein one forward key and one reverse key engage adjacent notches in the second surface in the engaged position.

10. The assembly as claimed in claim 6, wherein at least one of the keys is trapezoidal in cross section to facilitate movement of the at least one key out of its engaged position.

11. A method of controlling the engagement of planar first and second members, the first member having an inside first surface and at least one recess formed in the first surface, the planar second member being rotatable about a first axis and having an inside second surface extending generally normal to the first axis and disposed closely adjacent to the first surface, the second surface having at least one notch formed therein, the method comprising:

providing at least one free-floating, forward key and at least one free-floating, reverse key opposed to the at least one forward key, the keys being received and retained in the at least one recess but not physically secured to the first member;

urging the forward and reverse keys toward the second surface;

providing a single planar control member between the first and second surfaces and being rotatable about the first axis relative to the first member, the control member having at least one aperture which extends completely therethrough;

rotating the control member relative to the first member about the first axis, the at least one aperture allowing the keys to extend therethrough and engage the at least one notch in the second member in a first angular position of the control member wherein the control member maintains the keys in a disengaged position in a second angular position of the control member in which the first and second members are positioned to free-wheel relative to each other; and urging one of the keys to pivot about a key axis which is substantially parallel to the first axis to permit free-wheeling of the first and second members.

* * * * *